(12) United States Patent
Ougitani et al.

(10) Patent No.: US 8,106,124 B2
(45) Date of Patent: Jan. 31, 2012

(54) ANTIFOG COATING AND ANTIFOG ARTICLE

(75) Inventors: Yukihiro Ougitani, Mie (JP); Yoshinori Akamatsu, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 11/993,972

(22) PCT Filed: Jul. 11, 2006

(86) PCT No.: PCT/JP2006/313746
§ 371 (c)(1),
(2), (4) Date: Dec. 27, 2007

(87) PCT Pub. No.: WO2007/020759
PCT Pub. Date: Feb. 22, 2007

(65) Prior Publication Data
US 2009/0118428 A1  May 7, 2009

(30) Foreign Application Priority Data

Aug. 17, 2005 (JP) ................................. 2005-236533
Mar. 1, 2006 (JP) ................................. 2006-054663

(51) Int. Cl.
*C08G 18/00* (2006.01)
*B05D 1/00* (2006.01)
(52) U.S. Cl. .......................... 525/101; 525/103; 427/331
(58) Field of Classification Search .................. 525/101, 525/123; 427/331
See application file for complete search history.

(56) References Cited

U.S. PATENT DOCUMENTS

| 5,270,102 | A | * | 12/1993 | Allingham | ................. | 428/215 |
| 5,985,420 | A | * | 11/1999 | Haga et al. | ................. | 428/212 |
| 6,262,187 | B1 | | 7/2001 | Minami et al. | | |
| 2003/0077457 | A1 | * | 4/2003 | Akamatsu et al. | ............. | 428/429 |
| 2008/0160187 | A1 | * | 7/2008 | Murata et al. | ................. | 427/164 |

FOREIGN PATENT DOCUMENTS

| JP | 63-112669 A | 5/1988 |
| JP | 4-36376 A | 2/1992 |
| JP | 10-324731 A | 12/1998 |
| JP | 2000-239045 A | 9/2000 |
| JP | 2003-73147 A | 3/2003 |
| JP | 2003-201331 A | 7/2003 |
| JP | 2003-321251 A | 11/2003 |
| JP | 2004-76000 A | 3/2004 |
| JP | 2004-244612 A | 9/2004 |
| JP | 2004-268851 A | 9/2004 |
| JP | 2005-29723 A | 2/2005 |
| JP | 2005-187276 A | 7/2005 |
| JP | 2005-199246 | * 7/2005 |
| JP | 2005-199246 A | 7/2005 |
| JP | 2005-200617 A | 7/2005 |
| JP | 2006-169440 A | 6/2006 |

OTHER PUBLICATIONS

International Search Report dated Aug. 8, 2006 with English translation of relevant portion (Four (4) pages).
Corresponding Taiwanese Office Action dated Sep. 3, 2009 (Five (5) pages).

* cited by examiner

*Primary Examiner* — Ling Choi
*Assistant Examiner* — Chun-Cheng Wang
(74) *Attorney, Agent, or Firm* — Crowell & Moring LLP

(57) ABSTRACT

The present invention relates to an antifogging film formed on a transparent substrate. The antifogging film is characterized in that the film comprises a urethane resin having a water absorption percentage of 20-40 wt %, that the urethane resin is one derived from an acrylic polyol having an average molecular weight of 1000-4000 and a polyoxyalkylene-series polyol having an average molecular weight of 400-5000, that the film is used in an interior environment having a mechanism to forcibly remove water from the film after the water absorption saturation of the film, and that a water film is not formed upon showing antifogging property.

12 Claims, No Drawings

ANTIFOG COATING AND ANTIFOG ARTICLE

TECHNICAL FIELD

It relates to an antifogging film that can preferably be used as a window glass for an interior having a mechanism capable of controlling humidity, such as an air conditioner of automotive interior or the like.

BACKGROUND OF THE INVENTION

Transparent substrate such as glass is used for vehicular window glass, architectural window glass, lens, goggles, etc. In case that glass is used in a high-humidity place or at a boundary of a large temperature difference and a large humidity difference, however, there occur condensation and fogging on the surface. For example, in case that a vehicle is run in a high-humidity rainy season or in a low-temperature winter, the generation of the window fogging is inevitable. It is generally conducted to allow a dehumidifying wind, such as warm wind or cold wind, to blow against the window to make it in a dry condition in order to secure the visibility.

Therefore, a large energy is consumed for securing the visibility of window, and it has been a limitation in improving vehicular fuel consumption characteristics. In particular, a larger energy is consumed for securing the visibility of window in a winter season, in which the temperature difference between interior and exterior becomes great, particularly in a cold place that can have a below-freezing-point environment. Furthermore, there are also problems such as the increase of uncomfortableness of vehicle interior by making it in a dry condition. It is essential for environment and human-friendly vehicles to provide a window glass that can reduce these problems, that is, an antifogging article. Furthermore, the necessity of antifogging articles is expected to become higher in electric vehicles such as hybrid automobiles and fuel-cell automobiles.

As a vehicular antifogging glass, Patent Publication 1 discloses an antifogging vehicular glass prepared by applying a composition containing an organic antifogging material to a low ultraviolet transmission glass. Patent Publication 2 discloses a vehicular window glass having an interior surface, on which a hydrophilic layer that contains alumina and has a contact angle with of 30° or less to a water drop is formed.

Means for showing antifogging property in these publications are, however, mainly by a water film formation of a hydrophilic layer. Therefore, there occur defects such as one in which the image through the water film upon showing antifogging property is distortedly seen. Furthermore, the water film is frozen in a below-freezing-point environment. For melting the frozen water film, there rather occur problems such as one in which the energy consumption for the warm wind blow is necessary.

Patent Publication 1 discloses the use of a silica fine-particle series porous film and a water-absorbing resin as ones for showing antifogging property by water absorption property. The water absorption capabilities of these water absorptive films have not been enough, and further improvements have been necessary to show antifogging property by water absorption property. In addition, since there is no design from the viewpoint of showing antifogging property in a below-freezing-point environment, it is also expected to have a possibility of having defects such as the light transmission reduction and the film destruction by freezing of the absorbed water.

Under such background, the present applicant has proposed an antifogging glass suitable for a vehicular window that makes the window visibility securement easy even in a cold place that can be a below-freezing-point environment (Patent Publication 3). The antifogging glass uses a film by a urethane resin having hydrophilicity and water absorption property. The antifogging property is designed to show antifogging property first by water absorption of the film and to continue antifogging property by hydrophilicity of the film after water absorption saturation. Furthermore, it has a superior scratch resistance by elasticity inherent in urethane resin.

Patent Publication 1: Japanese Patent Application Publication 2000-239045
Patent Publication 2: Japanese Patent Application Publication 2003-321251
Patent Publication 3: Japanese Patent Application Publication 2005-187276

SUMMARY OF THE INVENTION

According to a design by showing a continuous antifogging property through hydrophilicity of the film, a water film is formed sometime on the film upon showing antifogging property. Therefore, there occur defects such as one in which the image through the water film is finally seen to be distorted. Thus, such defects could occur upon showing antifogging property for a long time, for example, upon driving for a long time in a cold place.

In view of the above, it is a task of the present invention to provide an antifogging film that shows antifogging property by only water absorption of the film, that is superior in durability, and that is suitable for the use in an interior environment having a mechanism to forcibly remove water from the film after the water absorption saturation of the film, such as automotive interior.

An antifogging film of the present invention is an antifogging film formed on a transparent substrate. It is characterized in that the film comprises a urethane resin having a water absorption percentage of 20-40 wt %, that the urethane resin is one derived from an acrylic polyol having an average molecular weight of 1000-4000 and a polyoxyalkylene-series polyol having an average molecular weight of 400-5000, that the film is used in an interior environment having a mechanism to forcibly remove water from the film after the water absorption saturation of the film, and that a water film is not formed upon showing antifogging property.

DETAILED DESCRIPTION

The above-mentioned mechanism to forcibly remove water from the film after the water absorption saturation is a mechanism that is capable of turning the surrounding environment of the film from a fog environment to no fog environment. An air conditioner or the like having a dehumidifying function, a wind blowing function such as cold wind or warm wind, temperature regulating function, or the like corresponds to the mechanism. The above-mentioned interior environment is considered to be particularly an automotive interior. It is preferable that the use of the antifogging film is particularly for an automotive window glass.

The above-mentioned fog occurs, when temperature and humidity of the film are in certain constant conditions. A fogging environment in the present invention is defined as an environment in which water condensation occurs on the entire surface of a single-glazing, soda-lime-silicate glass of a size of 100 mm×100 mm×3 mm (thickness) by float method.

An antifogging film of the present invention shows antifogging property by only the water absorption function of the film without forming a water film upon showing antifogging property. Therefore, in case that it is allowed to stand in a fog environment for a long time, water absorption is saturated, and showing of antifogging property is terminated. To be a superior antifogging film, it is preferable that the time for saturation of water absorption is as long as possible. The time until saturation of water absorption correlates with water absorption percentage of the film. Strength and durability of the film tend to lower by increasing water absorption percentage.

In the present invention, it is planned to have a coexistence of the prolongation of the time until saturation of water absorption with durability of the film, by adjusting water absorption percentage of the film to 20-40 wt %. If it is less than 20 wt %, it is necessary to make the film thickness thicker in order to prolong the time until saturation of water absorption. Therefore, it becomes difficult to obtain a homogeneous film. On the other hand, if it exceeds 40 wt %, there occur problems such as the increase of tackiness of the film, lowering of strength, and worsening of water resistance.

Even if water absorption percentage of the film is set to the above, the film turns into a water absorption saturation condition, and showing of antifogging property is terminated, when the film is exposed to a fog environment for a long time. In this case, it is turned into no fog environment condition by lowering humidity of the film surroundings or the like by a mechanism (hereinafter it may be referred to as defogger) for forcibly removing water from the film after water absorption saturation of the film, thereby removing water from the film to have a condition again showing antifogging property of the film.

The film used in the present invention is a film capable of reversible water absorption and desorption. To make a superior antifogging film, it is necessary to have a faster rate at which the water absorbed in the film desorbs. The faster rate can reduce the amount of energy loaded on the defogger. It becomes possible to continuously show antifogging property by using both of the antifogging film and the defogger. Since it does not form a water film upon showing antifogging property, it is preferably used for an automotive window glass due to no occurrence of distortion of the image appearing through the water film.

In order to prevent the formation of the water film upon showing antifogging property, it is preferable to adjust the contact angle of a water drop to the film to over 400, preferably 50-100°, preferably 60-90°.

In the present invention, the film comprises a urethane resin having a water absorption percentage of 20-40 wt %. The urethane resin is one derived from an acrylic polyol having an average molecular weight of 1000-4000 and a polyoxyalkylene-series polyol having an average molecular weight of 400-5000. It is considered that the chain in the urethane resin derived from an acrylic polyol having an average molecular weight of 1000-4000 and a polyoxyalkylene-series polyol having an average molecular weight of 400-5000 is effective for speeding up the desorption rate of the water absorbed in the film.

When it turns into a film, the polyoxyalkylene-series polyol provides the film with mainly a water absorption property. As this polyol, it is possible to use a polyol having oxyethylene chain, oxypropylene chain, or the like. Since oxyethylene chain in particular has a superior function of absorbing water as bound water, it is effective for achieving an antifogging film showing a reversible water absorption and desorption with a rapid water desorption rate upon water desorption. Therefore, it is preferable to use a polyol containing oxyethylene chain in view of antifogging property under a low temperature environment such as winter season in which the atmospheric temperature becomes 5° C. or lower.

The average molecular weight of the polyoxyalkylene-series polyol is adjusted to 400-5000. In case that the average molecular weight is less than 400, the capability of absorbing water as bound water is low. In case that the average molecular weight exceeds 5000, there tend to occur defects such as curing inferiority of the coating agent and lowering of the film strength. In view of water absorption property of the film, the film strength and the like, the average molecular weight is more preferably 400-4500. The average molecular weight in the present invention refers to number average molecular weight.

In case that the polyoxyalkylene-series polyol is particularly polyethylene glycol, it is preferable to adjust the average molecular weight to 400-2000 in view of the water-absorbing capacity, the curing inferiority and the film strength. In case that it is an oxyethylene/oxypropylene copolymer polyol, it is preferable to adjust the average molecular weight to 1500-5000.

A plurality of polyols may be used as the polyoxyalkylene-series polyol. In this case, it is preferable to necessarily use a polyethylene glycol having an average molecular weight of 400-2000, which has a particularly superior capability of absorbing water as bound water. Since this polyol has a particularly superior capability of absorbing water as bound water, this polyol may be used as all of the polyoxyalkylene-series polyol.

The acrylic polyol provides the film with mainly abrasion resistance, water resistance and the effect of lowering surface friction coefficient. In other words, it provides the film surface with slipping property. Besides this, this acrylic polyol is effective for shortening the leveling step that uniformizes the film thickness when the coating agent for forming the film has been applied to the substrate.

Of the above, slipping property is an important indicator from the practical viewpoint of the antifogging film. It is easily expected that various extraneous objects adhere to the surface of the antifogging film and interfere with the external appearance and the quality. In order to remove those extraneous objects, it is general to conduct wiping with cloth or the like. Upon this, in case that slipping property of the surface is insufficient, there occur defects, such as the increase of the removal time and the external appearance inferiority due to the wiping unevenness, in the wiping operation.

The extraneous objects are bound to rub against the film surface during the wiping operation. Therefore, in case that it has an inferior slipping property, it may provide adverse effects, such as that the extraneous objects tend to be caught on the film surface, that many scratches occur, and that a cloth or the like used in the wiping operation adheres to the film surface by contraries. If the film surface has a high slipping property, it shows a synergy effect such as improvement in abrasion resistance and stain resistance of the film and the like.

In view of that the wiping operation can be conducted during water absorption of the film, it is preferable that the antifogging film of the present invention is 0.8 or less under a condition that water is not absorbed by the film and 0.9 or less under a water absorption saturation condition, in terms of static friction coefficient of the film obtained in accordance with "JIS K 7125". The lower limit of this coefficient may be set to 0.4 or greater in view of water absorption property of the film, etc.

In the present invention, the acrylic polyol has an average molecular weight of 1000-4000. If it is less than 1000, abrasion resistance of the film tends to lower. If it exceeds 4000, applicability of the coating agent upon forming the film becomes worse, and the formation of the film tends to become difficult. Furthermore, in view of minuteness and hardness of the film, it is preferable that the number of hydroxy groups of this polyol is 3 or 4.

In the present invention, the chain in the urethane resin formed by being derived from the polyoxyalkylene-series polyol and the acrylic polyol is effective for making fast the desorption rate of water absorbed in the film. This tends to become faster by a greater molecular weight of the acrylic polyol. Therefore, the molecular weight of the acrylic polyol is preferably 2000 or greater.

The acrylic polyol contributes to the improvement of durability of the film and to making fast the desorption rate of water as mentioned above. In view of only the improvement of durability of the film, it is possible to use a hydrophobic polyol other than the acrylic polyol. However, it does not contribute to making fast the desorption rate of water. Therefore, we can say that the acrylic polyol is an essential chemical species for obtaining the antifogging film of the present invention.

In view of the above-mentioned slipping property of the film and wiping operability upon cleaning or the like, it is preferable that the resin further has a straight-chain polydimethylsiloxane in which the number of dimethylsiloxane units ($Si(CH_3)_2O$) as crosslinking units is 5-300. In this case, the straight-chain polydimethylsiloxane is introduced into the resin by the formation of urethane bonds at terminal portions.

Herein, the reason why the number of dimethylsiloxane units ($Si(CH_3)_2O$) has been set to 5-300 in the straight-chain polydimethylsiloxane is that it becomes difficult to introduce the straight-chain polydimethylsiloxane as the crosslinking unit into the urethane resin in case that the number of the dimethylsiloxane units is less than 5 or greater than 300.

The followings are considered as this reason. In case that the number of the dimethylsiloxane units is less than 5, there is no effect in improving the slipping property of the film. On the other hand, in case that it is greater than 300, the moiety at which the urethane bond of the straight-chain polydimethylsiloxane is to be formed becomes relatively low. Therefore, it becomes highly possible that the straight-chain polydimethylsiloxane is not incorporated into the resin as the crosslinking unit upon forming the resin. As a result, the obtained film becomes one in which the straight-chain polydimethylsiloxane tends to elute.

In view of the effect of improving the slipping property of the film and the wiping operability upon cleaning or the like, it is preferable that the straight-chain polydimethylsiloxane is added to have a weight concentration of 0.05-3.0 wt % relative to the film.

In addition, the antifogging film having water absorption function absorbs more water by having a thicker film thickness, and thereby it becomes possible to prolong the time until reaching the water absorption saturation condition. Therefore, it is advantageous to make the film thickness thicker from the viewpoint of antifogging property. However, a thick film thickness brings about disadvantageous conditions in the production of the film. In view of an indicator that no fog occurs for 60 seconds by exposure to 43° C. saturated water vapor, it is preferable to adjust the film thickness of the film to 5-50 μm.

The antifogging film of the present invention has a superior antifogging property such as fogging prevention even under below-freezing-point environment. Therefore, it maintains optical characteristics such as light transmission of the article under fog environment. Even after water absorption saturation, water is desorbed from the film with good sensitivity by a combination with a mechanism that forcibly removes water from the film, and it is possible to turn the film into a condition that can absorb water again, that is, a condition showing antifogging property. Therefore, it is easy to secure visibility by using an antifogging article having an antifogging film of the present invention as a window. In case that it is used as an automotive window, its effect is particularly outstanding and effective for improving safety of automobiles and improving fuel consumption.

The antifogging film of the present invention is an antifogging film that is formed on a transparent substrate. The film comprises a urethane resin having a water absorption percentage of 20-40 wt %. The urethane resin is one derived from a polyol component of an acrylic polyol having an average molecular weight of 1000-4000 and a polyoxyalkylene-series polyol having an average molecular weight of 400-5000. The antifogging article of the present invention is formed of the above antifogging film and a transparent substrate.

The antifogging film is obtained by applying a coating agent for forming the antifogging film to a transparent substrate, followed by curing. The coating agent can be a two-package curing type, coating agent formed of Coating Agent A having an isocyanate component having isocyanate group and Coating Agent B having the polyol component.

As the isocyanate component, it is possible to use an organic polyisocyanate such as organic diisocyanate and the like, preferably a trifunctional polyisocyanate having a biuret and/or isocyanurate structure using hexamethylenediisocyanate as the starting material. This material has weather resistance, chemical resistance and heat resistance and is effective particularly for weather resistance. Besides this material, it is possible to use diisophoronediisocyanate, diphenylmethanediisocyanate, bis(methylcyclohexyl)diisocyanate, toluene diisocyanate, etc.

It is preferable to adjust the number of the isocyanate groups existing in the isocyanate component to an amount of one time to two times the number of hydroxy groups existing in the polyol component in Coating Agent B, more preferably 1.4 times to 1.8 times that. In case that it is less than one time that, curing property of the coating agent becomes worse. Furthermore, the formed film is soft, and durability such as weather resistance, solvent resistance and chemical resistance lowers. On the other hand, in case that it exceeds two times that, antifogging property lowers since absorption and desorption of water vapor are disturbed by excessive curing.

The ratio of the polyoxyalkylene-series polyol to the acrylic polyol is adjusted such that water absorption percentage becomes 20-40 wt %. For example, in case that they are polyethylene glycol and acrylic polyol, it is preferable to have a component ratio of polyethylene glycol:acrylic polyol 50:50 to 70:30 by weight ratio.

It is possible to add a diluting solvent to Coating Agent A, B or a mixture of Coating Agents A and B. As the diluting solvent, it is necessary to use a solvent that is inert to isocyanate group. From compatibility with these coating agents, it is preferable to use acetate-series solvents, ketones, and diacetone alcohol.

Furthermore, it is optional to add an organic tin compound, which is a curing catalyst, to Coating Agent A, B or a mixture of Coating Agents A and B, for the purpose of increasing the curing rate of the film. As the compound, it is possible to use dibutyltin dilaurate, dioctyltin dilaurate, tin(II) octoate (stannous octoate), dibutyltin dioctoate, dibutyltin diacetate, dibutyltin mercaptide, dibutyltin thiocarboxylate, dibutyltin dimaleate, dioctyltin mercaptide, dioctyltin thiocarboxylate, and the like.

Furthermore, as a crosslinking unit in the resin, which forms the film, it is possible to introduce the straight-chain polydimethylsiloxane, which is preferably introduced into the film, by introducing the straight-chain polydimethylsiloxane, which has at both terminals functional groups that can react with isocyanate groups, into Coating Agent B or a mixture of Coating Agent A and Coating Agent B.

As the group that can react with the isocyanate group, it is possible to use functional groups having an active hydrogen bonded to oxygen, nitrogen or sulfur, which is large in electronegativity, such as hydroxy group, carboxy group, amino group, imino group, mercapto group, sulfino group, and sulfo group. Of these, in view of handling easiness, pot life as the coating agent, and durability of the obtained film, it is preferable to use hydroxy group as the functional group that can react with isocyanate group. Furthermore, it is optional to introduce a silicon compound into the film to be in the above-mentioned range of water absorption percentage in order to improve abrasion resistance and scratch resistance of the film. Therefore, it is optional to introduce a colloidal silica having an average particle diameter of 5-50 nm, a silicon compound having an alkoxy group, or the like, into the coating agent, particularly Coating Agent B. The average particle diameter herein refers to one obtained by a method based on JIS H 7803 (2005).

A coating agent for forming the film is obtained by mixing Coating Agents A and B obtained as above. As a means for applying the coating agent to a transparent substrate, it is possible to use a known means such as spin coating, dip coating, flow coating, roller coating, spraying, screen printing, or flexography. After the application, the liquid applied to the substrate is cured by standing still at room temperature of about 20° C. or by a heat treatment up to 170° C., thereby forming an antifogging film on the substrate. If the temperature of this heat treatment exceeds 170° C., care is necessary since there occur defects such as the generation of carbonation of the urethane resin and lowering of the film strength. In view of accelerating cure of the film, it is preferable to conduct a heat treatment at 80° C.-170° C.

As the transparent substrate for forming the antifogging film, glass is used as a typical one. The glass is a plate glass that is generally used for automotive, architectural and industrial glasses. It is a plate glass by float method, duplex method, roll-out method, or the like. The production method is not particularly limited.

As the glass type, it is possible to use various color glasses such as green and bronze as well as clear; various functional glasses such as UV and IR shielding glasses and electromagnetic shielding glasses; glasses usable for fire-retarding glasses such as wired glass, low-expansion glass and zero expansion glass; tempered glass and its analogous glasses; laminated glass, double glazing and the like; and various glass products such as flat plate and bent plate and the like.

The plate thickness is preferably 1.0 mm to 10 mm in particular. For vehicular use, 1.0 mm to 5.0 mm is preferable. The formation of the antifogging film on the substrate is preferably only on one side of the substrate. However, it may be conducted on both sides depending on the use. Furthermore, the antifogging film may be formed on the entire surface or a part of the substrate surface.

In case that a film is formed by applying the coating agent to a glass substrate, it is preferable to apply a liquid having a silane coupling agent, prior to applying the coating agent, in order to improve adhesion between the substrate and the film.

As an adequate silane coupling agent, it is possible to cite aminosilane, mercaptosilane, and epoxysilane. Preferable ones are γ-glycidoxypropyltrimethoxysilane, γ-aminopropyltriethoxysilane, and the like.

As the transparent substrate, it is possible to use resin films such as polyethyleneterephthalate, resins such as polycarbonate, and the like. It is optional that antifogging articles are formed by using these resin transparent substrates and the articles are bonded to glass substrates. It is optional to take a mode in which a film made of only an antifogging film component is bonded to a substrate such as glass substrate.

In the following, the present invention is specifically described by examples. Antifogging films obtained by the present examples and comparative examples were subjected to quality evaluation by the methods shown in the following.

[External appearance evaluation]: The external appearance, transparency and existence of cracks were evaluated by observation with naked eyes. One with no problem was judged as satisfactory (O), and one with problem as unsatisfactory (x).

[Water absorption percentage of the film]: After maintenance for 12 hours in an environment of a humidity of 50% and a temperature of 55° C., it was maintained for 12 hours in an environment at the same humidity and a temperature of 25° C. Upon this, the weight (a) of the antifogging article was measured. A saturated water vapor of 43° C. was brought into contact with the film for 5 minutes, and immediately thereafter the water film of the film surface was wiped off. Then, the weight (b) of the article was measured. The value obtained by the formula of [b−a]/[a−(the weight of the glass substrate)]×100(%) was defined as water absorption percentage upon water absorption saturation. That is, water absorption percentage refers to the amount of water absorbable, relative to the weight of the antifogging film, expressed by weight percentage. The value of (a) herein corresponds to one in a condition that water has not been absorbed by the film.

[Desorption rate of water absorbed in the film]: One that the time during which it reached from the above weight (b) to the above weight (a) was 3 minutes or shorter, when it was placed in an environment of a humidity of 50% and a temperature of 25° C., with respect to the antifogging film under the water absorption saturation condition obtained as above, was judged as satisfactory (O) as an antifogging film having a superior water desorption property. One not satisfying this was judged as unsatisfactory (x).

[Repeated antifogging property]: Based on ≡JIS S 4030 antifogging agent test method for eyeglasses≡, a fog condition when it has been maintained for 1 minute in a saturated water vapor from warm water set at 43° C., and a fog condition by exhalation when it has been taken into normal temperature (23° C.; humidity: 63%) after the maintenance are observed. This operation was defined as one cycle, and 30 cycles were conducted. One having no abnormality of external appearance of the film and no occurrence of fogging was judged as satisfactory (O), and one having occurrence of fogging was judged as unsatisfactory (x). This evaluation can be taken as an indicator of persistence of antifogging property.

[Below-freezing-point antifogging property]: The external appearance, fog condition, and fog by exhalation when it has been taken into normal temperature (23° C., humidity: 63%) after retaining it for 30 minutes in a refrigerator set at −25° C. are observed. This operation was defined as one cycle, and 10 cycles were conducted. One having no abnormality of external appearance of the film and no occurrence of fogging was judged as satisfactory (O), and one having occurrence of fogging was judged as unsatisfactory (x).

[Traverse abrasion resistance]: The external appearance and exhalation antifogging property when a flannel (cotton No. 300) has been reciprocated 5000 times on the film surface with a load of 4.9 N/4 cm$^2$ were measured. One having no abnormality was judged as satisfactory (O), and one having abnormality was judged as unsatisfactory (x).

[Pencil hardness]: Based on ≡=JIS K 5600 paint general test method≡, the film surface was scratched 5 times with pencils under a load of 1 kg. A pencil, which had caused breaking of the film less than two times, was taken as pencil hardness. This pencil hardness can be taken as an indicator of scratch resistance.

[Water resistance]: It was immersed in water of 40±2° C. for 24 hours. After the immersion, one having no abnormality of the external appearance, no occurrence of fogging by exhalation, and a pencil hardness decrease of 1 rank or less was judged as (O), and one having a decrease of 2 ranks or more was judged as unsatisfactory (x).

[Slipping property]: Based on ≡JIS K 7125 plastic-film and sheet-friction coefficient test method≡, a square slipping piece having a contact area of 40 cm$^2$ (length of one edge: 6.3 cm) was placed on the antifogging film under a load of 200 g, thereby measuring slipping property. The bottom surface (the surface contact with the test piece) of the slipping piece was covered with a flannel (cotton No. 300) on the assumption of a wiping with cloth under practical use.

Herein, in static friction coefficient derived from the measured value, one that was 0.8 or less under a condition that water was not absorbed in the film and that was 0.9 or less under a water absorption saturation condition of the film was judged as satisfactory (O), and one that did not satisfy this was judged as unsatisfactory (x).

[Contact angle of water drop to the film]: The contact angle of a water drop to the film was measured based on "JIS 3257 wettability test method of substrate glass surface". A test piece cut into a 100 mm square was maintained for 12 hours in an environment of a humidity of 50% and a temperature of 55° C. and then maintained for 12 hours in an environment at the same humidity and of a temperature of 25° C., thereby making a test piece under a condition that water is not absorbed in the film. This test piece was set in a contact angle meter (CA-2 type) made by KYOWA INTERFACE SCIENCE CO., LTD. A 2 μl water was dropped onto the film, and the contact angle of the water drop was measured. Furthermore, 43° C. saturated water vapor was brought into contact with the film of the test piece to turn the film into a water absorption saturation condition. This test piece was set in the contact angle meter, and a 2 μl water was dropped onto the film to measure the contact angle of the water drop.

[Film thickness measurement of the film]: Upon preparing the sample, a masking film (product name: "SPV-400X" made by NITTO DENKO CORPORATION) is bonded to a part of the substrate, and an antifogging article is prepared. Then, the masking film is removed. The film thickness of the film was measured by measuring a step portion formed of the film and the substrate with a high-precision microfigure measuring instrument (SURFCORDER ET 4000A, made by Kosaka Laboratory Ltd.).

Example 1

Preparation of Coating Agent for Forming an Antifogging Film

As an isocyanate having an isocyanate group, a buiret-type polyisocyanate of hexamethylenediisocyanate (trade name: "N3200" made by Sumitomo Bayer Urethane Co.) was used as Coating Agent A.

Polyethylene glycol having an average molecular weight of 1000, and a solution ("Desmophene A450MPA/X" made by Sumika Bayer Urethane Company) containing 50 wt % of an acrylic polyol of an average molecular weight of 3000 were prepared. They were mixed together to have a weight ratio of the polyethylene glycol to the acrylic polyol of 60:40. This was used as Coating Agent B.

In order to make the number of the isocyanate groups existing in the isocyanate component of Coating Agent A become 1.6 times the number of the hydroxy groups existing in the polyol component in Coating Agent B, 33 g of Coating Agent A were added and mixed relative to 100 g of Coating Agent B. In order to make the total amount of the urethane component become 35 wt %, isobutyl acetate as a diluting solvent was added to and mixed with the mixture of Coating Agent A and Coating Agent B, thereby preparing a coating agent for forming an antifogging film.

(Preparation of Antifogging Article)

A solution was prepared by a denatured alcohol (EKINEN F-1, made by Kishida Chemical) formed of 90 wt % ethanol and 10 wt % isopropyl alcohol to make γ-aminopropyltriethoxysilane (LS-3150, made by Shin-Etsu Silicones) be in 1 wt %. Then, this solution was applied by wiping the surface of a glass substrate of 100 mm×100 mm (3.5 mm thick) obtained by float method, with a wiper (trade name: BEMCOT, type: M-1, 50 mm×50 mm, made by OZU CORPORATION) made of cellulose fibers that had absorbed the solution. After drying under room temperature condition, the film surface was washed with water and the wiper using tap water, thereby preparing a transparent substrate.

The above-obtained coating agent for forming an antifogging film was applied to the transparent substrate by spin coating. This coated glass substrate was subjected to a heat treatment at about 100° C. for about 30 minutes, thereby obtaining an antifogging article having an antifogging film of a film thickness of 16 μm formed.

The antifogging article obtained by the above method was confirmed to be an article superior in various characteristics, as shown in Table 1.

TABLE 1

| | External Appearance Evaluation | Water Absorption Desorption Property Evaluation | | Antifogging Property | | Film Strength | |
| --- | --- | --- | --- | --- | --- | --- | --- |
| | | Water Absorption Percentage/% | Water Desorption Property | Repetition | Below Freezing Point | Traverse Abrasion Resistance | Pencil Hardness |
| Example 1 | o | 30 | o | o | o | o | H |
| Example 2 | o | 20 | o | o | o | o | 2 H |
| Example 3 | o | 38 | o | o | o | o | H |
| Example 4 | o | 30 | o | o | o | o | 2 H |
| Example 5 | o | 29 | o | o | o | o | 2 H |

TABLE 1-continued

| | | | Slipping Property Evaluation | | | Contact Angle of Water Drop | |
|---|---|---|---|---|---|---|---|
| | Water Resistance | | Condition of No Water Absorption | Water Absorption Saturation Condition | | Condition of No Water Absorption | Water Absorption Saturation Condition |
| | External Appearance | Pencil Hardness | | | Judgment | | |
| Com. Ex. 1 | ○ | 4 | x | x | x | ○ | 3 H |
| Com. Ex. 2 | ○ | 65 | x | ○ | ○ | x | B |
| Com. Ex. 3 | ○ | 52 | ○ | ○ | ○ | x | F |
| Com. Ex. 4 | ○ | 13 | ○ | x | x | ○ | 2 H |
| Com. Ex. 5 | ○ | 35 | x | ○ | ○ | x | HB |
| Example 1 | ○ | ○ (H) | 0.7 | 0.8 | ○ | 68 | 68 |
| Example 2 | ○ | ○ (2 H) | 0.6 | 0.65 | ○ | 72 | 73 |
| Example 3 | ○ | ○ (F) | 0.8 | 0.9 | ○ | 63 | 64 |
| Example 4 | ○ | ○ (2 H) | 0.5 | 0.55 | ○ | 85 | 85 |
| Example 5 | ○ | ○ (2 H) | 0.55 | 0.6 | ○ | 83 | 84 |
| Com. Ex. 1 | ○ | ○ (3 H) | 0.5 | 0.5 | ○ | 87 | 86 |
| Com. Ex. 2 | x | x (4 B) | 1.7 | 2.1 | x | 38 | 30 |
| Com. Ex. 3 | x | x (2 B) | 1.2 | 1.6 | x | 46 | 35 |
| Com. Ex. 4 | ○ | ○ (2 H) | 0.65 | 0.7 | ○ | 75 | 75 |
| Com. Ex. 5 | ○ | x (2 B) | 0.8 | 0.9 | ○ | 70 | 65 |

Example 2

An antifogging article having an antifogging film of a film thickness of 27 μm formed was obtained by conducting operations similar to those of Example 1, except in that the mixing was conducted such that the weight ratio of respective components in the preparation of Coating Agent B in Example 1 became "polyethylene glycol:acrylic polyol ~50:50" and in that the amount of addition and mixing of Coating Agent A was 35 g relative to Coating Agent B of 100 g such that the number of the isocyanate groups existing in the isocyanate component of Coating Agent A became 1.8 times the number of the hydroxy groups existing in the polyol component in Coating Agent B. As shown in Table 1, the obtained article was confirmed to be an antifogging article superior in various antifogging properties, various abrasion properties and water resistance.

Example 3

An antifogging article having an antifogging film of a film thickness of 12 μm formed was obtained by conducting operations similar to those of Example 1, except in that the mixing was conducted such that the weight ratio of respective components in the preparation of Coating Agent B in Example 1 became "polyethylene glycol: acrylic polyol=70:30" and in that the amount of addition and mixing of Coating Agent A was 30 g relative to Coating Agent B of 100 g such that the number of the isocyanate groups existing in the isocyanate component of Coating Agent A became 1.4 times the number of the hydroxy groups existing in the polyol component in Coating Agent B. As shown in Table 1, the obtained article was confirmed to be an antifogging article superior in various antifogging properties, various abrasion properties and water resistance.

Example 4

An antifogging article having an antifogging film of a film thickness of 20 μm formed was obtained by conducting operations similar to those of Example 1, except in that a both-terminal hydroxy, straight-chain, polydimethylsiloxane, in which the number of dimethylsiloxane units was 7, (trade name: "DMS-S12" made by AZmax Co.) was added by 1.0 wt %, based on the total amount of the urethane component, to the mixture of Coating Agent A and Coating Agent B in Example 1, in which the total amount of the urethane component was 35 wt %. As shown in Table 1, the obtained article was confirmed to be an antifogging article superior in various antifogging properties, various abrasion properties and water resistance.

Example 5

An antifogging article having an antifogging film of a film thickness of 8 μm formed was obtained by conducting operations similar to those of Example 4, except in that a both-terminal hydroxy, straight-chain, polydimethylsiloxane, in which the number of dimethylsiloxane units was 243, (trade name: "DMS-S27" made by AZmax Co.) was used. As shown in Table 1, the obtained article was confirmed to be an antifogging article superior in various antifogging properties, various abrasion properties and water resistance.

Comparative Example 1

An antifogging article having an antifogging film of a film thickness of 11 μm formed was obtained by conducting operations similar to those of Example 1, except in that only the acrylic polyol was used in Coating Agent B without using the polyethylene glycol, and that the amount of addition and mixing of Coating Agent A was 18 g relative to Coating Agent B of 100 g such that the number of the isocyanate groups existing in the isocyanate component of Coating Agent A became 1.6 times the number of the hydroxy groups existing in the polyol component in Coating Agent B. As shown in Table 1, the obtained article was one that did not show antifogging property at all.

Comparative Example 2

An antifogging article having an antifogging film of a film thickness of 28 μm formed was obtained by conducting operations similar to those of Example 1, except in that only the polyethylene glycol was used in Coating Agent B without using the acrylic polyol, and that the amount of addition and mixing of Coating Agent A was 51 g relative to Coating Agent B of 100 g such that the number of the isocyanate groups existing in the isocyanate component of Coating Agent A became 1.4 times the number of the hydroxy groups existing in the polyol component in Coating Agent B. As shown in Table 1, as to the obtained article, the cloth adhered to the film surface in the traverse abrasion resistance test to cause external appearance inferiority, it was inferior in slipping property, and the film surface had a sticky feeling. Furthermore, it was an article having an inferior response of water absorption and desorption, since it was necessary to take 6 minutes until desorption of water in the test of desorption rate of water absorbed in the film.

Comparative Example 3

An antifogging article having an antifogging film of a film thickness of 22 μm formed was obtained by conducting operations similar to those of Example 1, except in that the mixing was conducted such that the weight ratio of respective components in the preparation of Coating Agent B in Example 1 became "polyethylene glycol:acrylic polyol=80: 20" and in that the amount of addition and mixing of Coating Agent A was 39 g relative to Coating Agent B of 100 g such that the number of the isocyanate groups existing in the isocyanate component of Coating Agent A became 1.4 times the number of the hydroxy groups existing in the polyol component in Coating Agent B. As shown in Table 1, as to the obtained article, the cloth adhered to the film surface in the traverse abrasion resistance test to cause external appearance inferiority, and it was inferior in water resistance.

Comparative Example 4

An antifogging article having an antifogging film of a film thickness of 15 μm formed was obtained by conducting operations similar to those of Example 1, except in that the mixing was conducted such that the weight ratio of respective components in the preparation of Coating Agent B in Example 1 became "polyethylene glycol:acrylic polyol=25: 75" and in that the amount of addition and mixing of Coating Agent A was 20 g relative to Coating Agent B of 100 g such that the number of the isocyanate groups existing in the isocyanate component of Coating Agent A became 1.4 times the number of the hydroxy groups existing in the polyol component in Coating Agent B. As shown in Table 1, the obtained article was inferior in antifogging property.

Comparative Example 5

An antifogging article having an antifogging film of a film thickness of 19 μm formed was obtained by conducting operations similar to those of Example 1, except in that a polycaprolactonediol having an average molecular weight of 500 (trade name: PLACCEL L205AL, made by DAICEL CHEMICAL INDUSTRIES, LTD.) was used as a polyol showing hydrophobicity in place of the acrylic polyol, in that the mixing was conducted such that the weight ratio of respective components became "polyethylene glycol:polycaprolactonediol=60:40", and in that the amount of addition and mixing of Coating Agent A was 73 g relative to Coating Agent B of 100 g such that the number of the isocyanate groups existing in the isocyanate component of Coating Agent A became 1.8 times the number of the hydroxy groups existing in the polyol component in Coating Agent B. As shown in Table 1, as to the obtained article, the cloth adhered to the film surface in the traverse abrasion resistance test to cause external appearance inferiority. Furthermore, pencil hardness lowered by two ranks in the water resistance test, thereby showing scratch resistance inferiority of the film upon water absorption. Furthermore, it was an article having an inferior response of water absorption and desorption, since it was necessary to take 5 minutes until desorption of water in the test of desorption rate of water absorbed in the film.

The invention claimed is:

1. An antifogging film formed on a transparent substrate, the antifogging film comprising a urethane resin having a water absorption percentage of 20-40 wt %, the urethane resin being one derived from (a) an isocyanate component having an isocyanate group and (b) a polyol component having an acrylic polyol having an average molecular weight of 1000-4000 and a polyoxyalkylene-series polyol having an average molecular weight of 400-5000, wherein the polyoxyalkylene-series polyol is polyethylene glycol and a weight ratio of the polyethylene glycol to the acrylic polyol is from 50:50 to 70:30.

2. An antifogging film according to claim 1, wherein the polyethylene glycol having has an average molecular weight of 400-2000.

3. An antifogging film according to claim 1, wherein the resin further comprises a straight-chain polydimethylsiloxane, in which the number of dimethylsiloxane units ($Si(CH_3)_2O$) is 5-300, as a crosslinking unit.

4. An antifogging film according to claim 1, wherein a static friction coefficient of the film, which is obtained based on "JIS K 7125", is 0.8 or less under a condition that water is not absorbed by the film and 0.9 or less under a water absorption saturation condition.

5. An antifogging film according to claim 1, wherein the film has a film thickness of 5-50 μm.

6. An antifogging article comprising a film according to claim 1 and a transparent substrate.

7. A two-component coating agent for forming an antifogging film comprising:
a first coating agent containing an isocyanate component having an isocyanate group; and
a second coating agent containing a polyol component, the polyol component having an acrylic polyol and a polyoxyalkylene-series polyol,
wherein the acrylic polyol has an average molecular weight of 1000-4000 and the polyoxyalkylene-series polyol has an average molecular weight of 400-5000,
wherein the polyoxyalkylene-series polyol in the second coating agent is polyethylene glycol and a weight ratio of the polyethylene glycol to the acrylic polyol in the second coating agent is from 50:50 to 70:30.

8. A process for producing an antifogging film, comprising the steps of:
(a) applying a two-component coating agent according to claim 7 to a transparent substrate, thereby forming thereon a preliminary film; and
(b) hardening the preliminary film into the antifogging film.

9. A process for securing visibility of a transparent substrate, comprising the step of using an antifogging film according to claim 1 in an interior environment having a mechanism to forcibly remove water from the film after a water absorption saturation of the film, thereby not forming a water film upon showing antifogging property.

10. A process according to claim 9, wherein the interior environment is an automotive interior.

11. A process for securing visibility of a transparent substrate by not generating fog on an antifogging film according to claim 1, when the antifogging film has been exposed to normal temperature after the antifogging film had been kept in a freezer.

12. An antifogging film according to claim 1, wherein the antifogging film consists essentially of the urethane resin.

* * * * *